US012736002B2

(12) United States Patent
Ahmed

(10) Patent No.: US 12,736,002 B2
(45) Date of Patent: Sep. 15, 2026

(54) PORTABLE CARBON CAPTURE SYSTEM

(71) Applicant: QATAR UNIVERSITY, Doha (QA)

(72) Inventor: Samer Ahmed, Doha (QA)

(73) Assignee: QATAR UNIVERSITY, Doha (QA)

( * ) Notice: Subject to any disclaimer, the term of this patent is extended or adjusted under 35 U.S.C. 154(b) by 0 days.

(21) Appl. No.: 19/043,333

(22) Filed: Jan. 31, 2025

(65) Prior Publication Data

US 2025/0250918 A1 Aug. 7, 2025

Related U.S. Application Data

(60) Provisional application No. 63/549,206, filed on Feb. 2, 2024.

(51) Int. Cl.

| | |
|---|---|
| ***B01D 53/18*** | (2006.01) |
| ***B01D 53/62*** | (2006.01) |
| ***F01N 3/08*** | (2006.01) |
| *B01D 53/79* | (2006.01) |

(52) U.S. Cl.

CPC .......... *F01N 3/0857* (2013.01); *B01D 53/18* (2013.01); *B01D 53/62* (2013.01); *B01D 53/79* (2013.01)

(58) Field of Classification Search

CPC ... F01N 3/0857; B01D 53/0423; B01D 53/18; B01D 53/185; B01D 53/62; B01D 53/79

See application file for complete search history.

(56) References Cited

U.S. PATENT DOCUMENTS

| | | | | |
|---|---|---|---|---|
| 2020/0147542 | A1* | 5/2020 | Jolly | B01D 53/18 |
| 2022/0288527 | A1 | 9/2022 | Noborisato et al. | |
| 2023/0127859 | A1 | 4/2023 | Voice et al. | |
| 2023/0130504 | A1* | 4/2023 | Voice | B01D 53/1418 60/274 |
| 2023/0145006 | A1 | 5/2023 | Einbu et al. | |
| 2024/0042370 | A1* | 2/2024 | Juchymenko | B01D 53/0454 |
| 2024/0157285 | A1* | 5/2024 | Liu | B01D 53/1425 |
| 2025/0058270 | A1* | 2/2025 | Federici | B01D 53/18 |
| 2025/0347238 | A1* | 11/2025 | Kamijo | F01N 3/04 |

FOREIGN PATENT DOCUMENTS

| | | | | |
|---|---|---|---|---|
| CN | 119075678 A | | 12/2024 | |
| KR | 20240159352 A | | 11/2024 | |
| WO | WO-2025136354 A1 | * | 6/2025 | F01K 23/10 |

OTHER PUBLICATIONS

Screenshots from https://remoracarbon.com/, Accessed via the Internet Archive's Wayback Machine [accessed on Jan. 12, 2024].

Zhongcheng Wang et al., "Study of Absorbing CO2 from Emissions Using a Spray Tower", Atmosphere 2022, 13, 1315, https://doi.org/10.3390/atmos13081315, 16 pages.

* cited by examiner

*Primary Examiner* — Jonathan R Matthias

(74) *Attorney, Agent, or Firm* — HODGSON RUSS LLP

(57) ABSTRACT

Described herein is a portable carbon capture system that can be easily installed with any diesel engine vehicle, such as trucks and busses, that significantly reduces $CO_2$ emissions from these engines.

19 Claims, 12 Drawing Sheets

PORTABLE CARBON CAPTURE SYSTEM

CROSS REFERENCE TO RELATED APPLICATIONS

This application claims priority to U.S. Ser. No. 63/549,206 filed Feb. 2, 2024, the entirety of which is incorporated herein for all purposes.

FIELD

Described herein is a portable carbon capture system that can be easily installed with any diesel engine vehicle, such as trucks and busses, that significantly reduces $CO_2$ emissions from these engines.

BACKGROUND

Due to the increase in the global warming rate, caused by greenhouse gases like carbon dioxides ($CO_2$) and nitrogen oxides (NOx) emissions, the air has become more polluted and the weather temperature has increased. Pollution, especially from the transportation and automotive sectors in addition to emissions from burning fossil fuel, is further linked to global warming and climate change, and in the past few years, there have been regulatory actions to limit this type of pollution. As a result, the modern industry produces clean energy by new methods and techniques such as electric cars, but these methods were not designed for high-power diesel engines such as those used in heavy duty vehicles. Consequently, heavy-duty vehicles will continue to use diesel engines. Therefore, developing a system to capture $CO_2$ emissions from diesel engine can significantly solve the problem of diesel engine pollution. Carbon capture and sequestration (CCS) is currently used only in large industrial applications such as oil and gas, but not with diesel engines. Hence, a portable $CO_2$ capture system to reduce and even eliminate $CO_2$ emission from diesel engines used in different applications can contribute significantly to the global efforts to reduce global warming.

SUMMARY

Described herein is a portable carbon capture system that can be easily installed with any diesel engine vehicle, such as trucks and busses, that significantly reduces $CO_2$ emissions from these engines. In one embodiment, the portable carbon capture system is used with stationary diesel engines, such as stationary electric generators driven by diesel engines to supply electricity to rural areas or for special purposes (e.g. stand-by generators in hospitals, festivals and ceremonies, etc).

In certain embodiments, the used solvent to capture $CO_2$ may be stored in a tank and then taken to a regeneration process in a separate location in order to be used again in the system. Adding a regeneration unit to the system may be complicated, expensive and not practical due to space limitations on vehicles. However, this can be mitigated by establishing a regeneration unit in every garage or parking lot that holds a large number of these vehicles, as shown in FIG. 6. Usually, diesel vehicles or equipment are operated in large numbers by certain companies, and at the end of the operation, they are parked together in big areas, enabling easy establishment of a regeneration process.

Conventional carbon capture devices use carbon-scrubbing technology to filter $CO_2$ out of the exhaust through solid beads. However, the portable $CO_2$ capture system described herein has a simple and very effective design, and can easily be installed on-board any diesel vehicle, equipment, and even stationary engines such as diesel generators. Moreover, the current system uses different technology including, for example, $CO_2$ absorption using an amine spray.

DETAILED DESCRIPTION

Certain embodiments may provide a portable carbon capture and storing system that is able to reduce carbon dioxide ($CO_2$) emissions of diesel engine exhaust gases where they would be stored in a storage tank while less-carbon exhaust gases are released to the atmosphere. That way the greenhouse gases are reduced from diesel engines, which can be a solution for reducing carbon emissions from transportation sectors.

In certain embodiments, the portable $CO_2$ system may include an exhaust column with sub-systems that can be installed easily with any diesel engine. The testing on a real diesel engine shows that they system significantly reduces $CO_2$ emissions from such engines without affecting the engine operation. Although carbon capture is a well established technology in big industries such as oil and gas industry, this technology has not been implemented on a portable scale for vehicle engines, and in particular diesel engines Certain embodiments may provide a new system. For instance, certain embodiments are directed to an exhaust column with a special design that can be easily installed with existing exhaust systems of any diesel truck, bus, equipment, etc.

Figure 1:
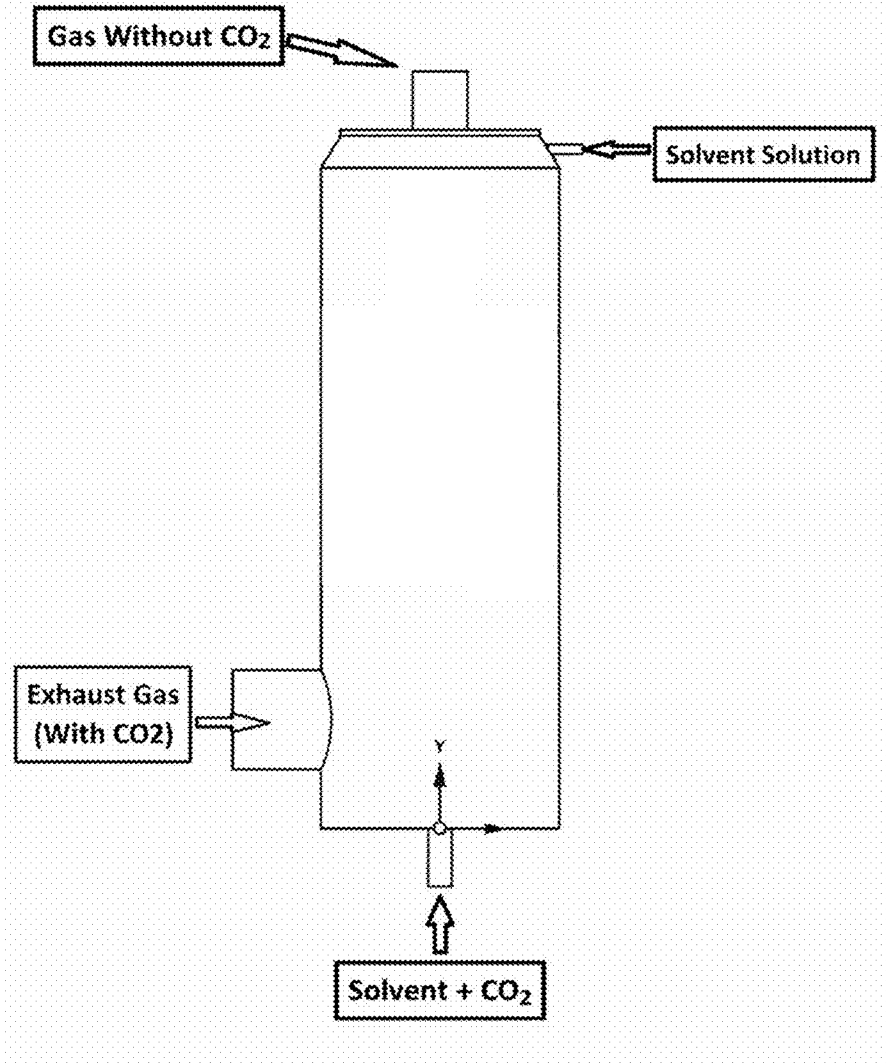
FIG. 1 illustrates an example schematic diagram of an outer design of a portable $CO_2$ capture column.
Figure 2:
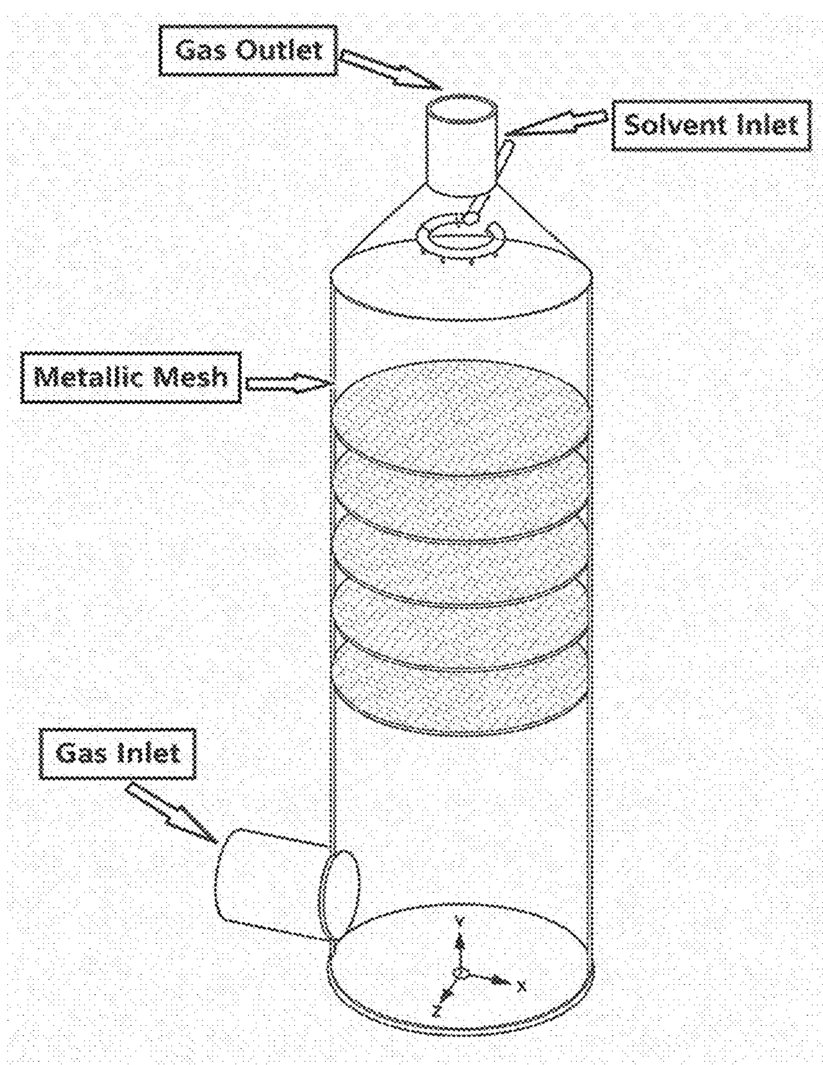
FIG. 2 illustrates an example schematic diagram of an inner design of the portable $CO_2$ capture column.

The carbon capture system may include an absorber column, which plays a crucial role in capturing carbon dioxide. In this column, the exhaust gas from the diesel engine is introduced at the lower section, while the absorbing liquid (solvent) is introduced at the top and flows downwards against the upward flow of gas, as shown in FIG. 1. To enhance the contact between the gas and liquid, a packed column design is utilized, employing plates that increase the interfacial area for effective liquid-gas interaction as shown in FIG. 2. This packed column, chosen as the best alternative, has a height of 80 cm and a diameter of 20 cm. This system is easily manufactured and gives enough time for the solvent to absorb effectively.

In certain embodiments, the size of droplets can be an important parameter. To maximize the exposed surface area, the liquid may be broken down into the smallest possible droplets, for example, about a 0.3 mm diameter in the system. One approach to achieve this is with spray systems that feature a single nozzle capable of emitting the solvent in a cone-shaped fog pattern. The resulting spray is round in shape at the end of the pattern, effectively covering the maximum possible surface area. Small droplets offer greater surface area per unit volume, allowing for more efficient and effective delivery of the liquid, and they tend to remain in the air for longer periods, which can increase the time available for the liquid to interact with its surroundings.

One exemplary objective of the spray system in certain embodiments is to optimize the design of spray locations to maximize carbon capture, ensuring effective coverage over the largest possible surface area. In certain embodiments, this spray system may include three components: pipes, a 90-degree elbow, and a nozzle. The pipes may be constructed from stainless steel 316 due to its outstanding corrosion resistance, strength, durability, and ability to withstand high temperatures in accordance with ISO 7191. Furthermore, proper connection and extension of the pipes may be achieved through welding techniques.

Figure 3:
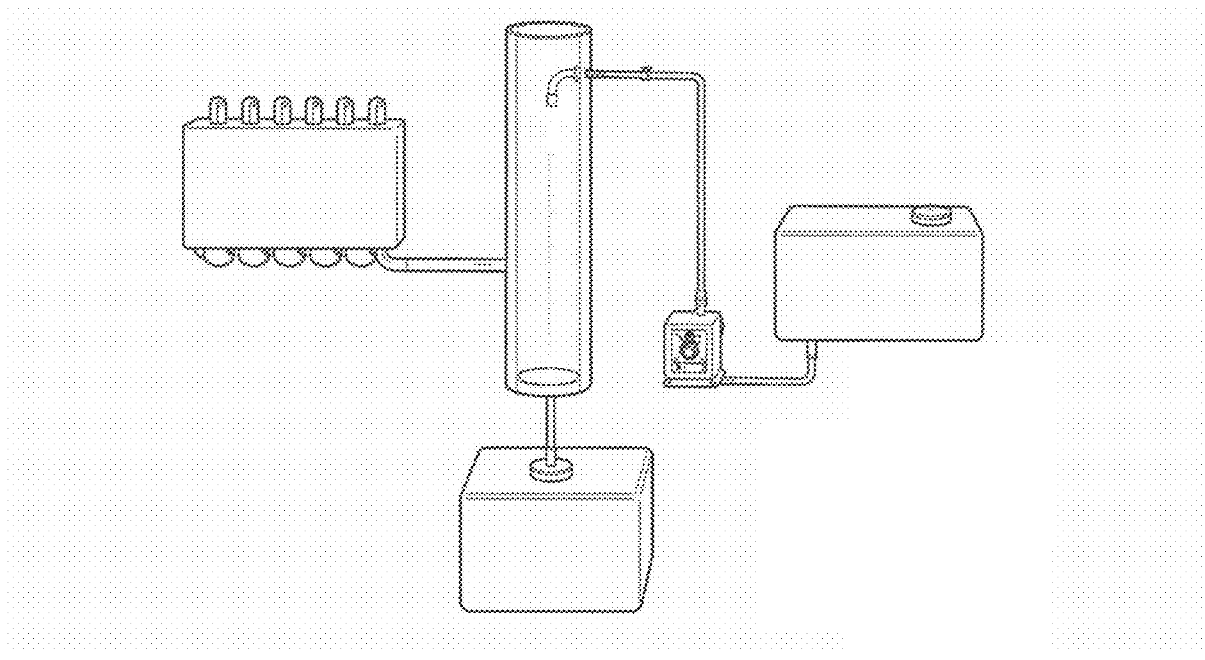
FIG. 3 illustrates an example schematic diagram of the complete $CO_2$ capture system.

After thoroughly evaluating various pump options, a positive displacement pump may be selected as the final design due to its superior reliability and compatibility compared to the other options. The positive displacement pump may have many advantages including, for example, its reliability and compatibility, performance, cost, and weight. It is expected to provide excellent performance and effectively meet the system's needs, as shown in FIG. 3. In addition to the pump, the spray system may include components such as the delivery and drain tanks and the pipes connecting the tanks with the spraying system.

Figure 4:
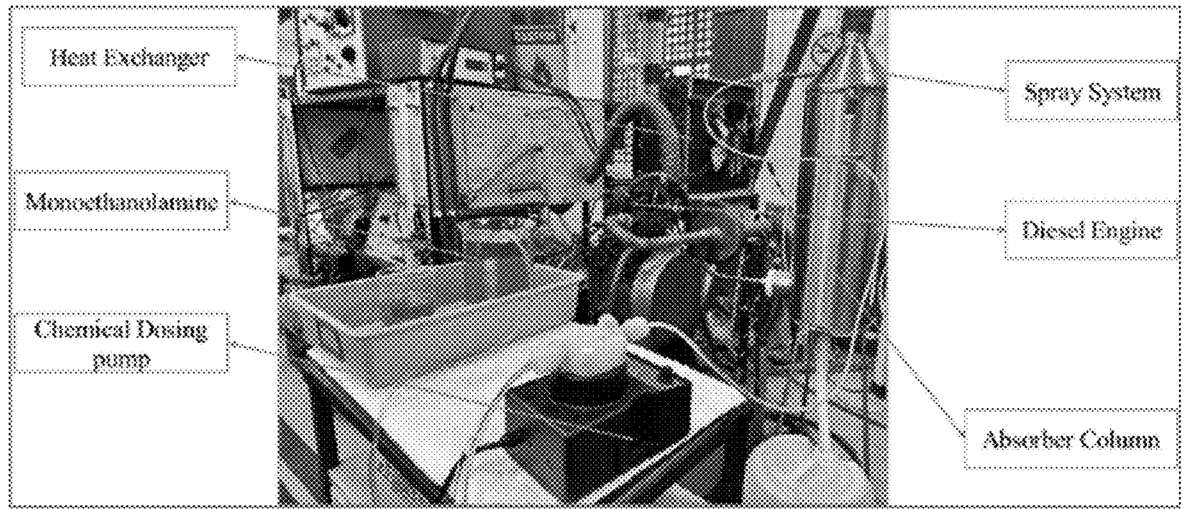
FIG. 4 illustrates a photo diagram of the portable $CO_2$ capture system being testing on a diesel engine.
Figure 5A:
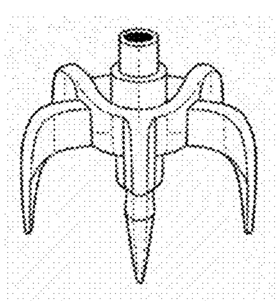
FIG. 5A illustrates one example of a spray alternative of a solvent material inside the $CO_2$ capture column: six nozzles as described in Alternative 1.
Figure 5B:
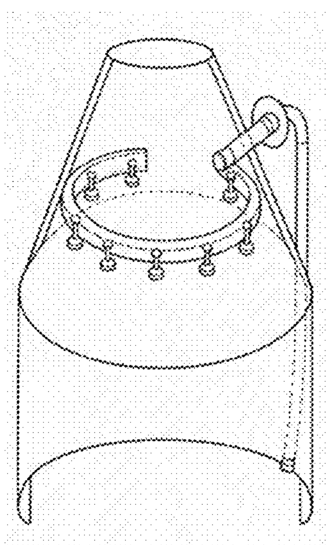
FIG. 5B illustrates one example of a spray alternative of a solvent material inside the $CO_2$ capture column: nine nozzles as described in Alternative 2.
Figure 5C:
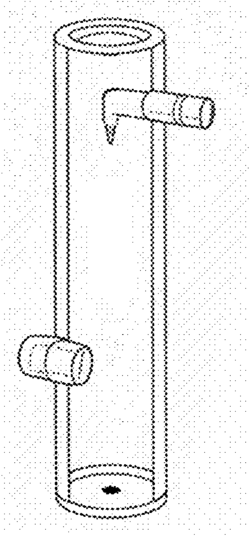
FIG. 5C illustrates one example of a spray alternative of a solvent material inside the $CO_2$ capture column: a single nozzle as described in Alternative 3.
Figure 6A:
FIG. 6A illustrates a parking area for diesel vehicles.
Figure 6B:
FIG. 6B illustrates equipment of at a construction company.

In some embodiments, the $CO_2$ capture system may also include a fin and tube heat exchanger designed to effectively cool down the exhaust gas emitted from the diesel engine to a temperature lower than 50° C. as shown in FIG. 4. This cooling process can facilitate the subsequent reaction between the exhaust gas and the MEA (monoethanolamine) solution, which is the solvent typically chosen for this system. In certain embodiments, the dimensions of the heat exchanger measure about 54 cm in length, about 50 cm in height, and feature a configuration of about 12 fins per inch. The heat exchanger also employs copper pipes with a diameter of about 0.5 inches. The heat exchanger may be designed to ensure optimal heat transfer and efficient cooling of the exhaust gas, enabling the desired reaction with the MEA.

The operational procedure of the product commences by closing the exhaust outlet valve, allowing the exhaust gas to enter the heat exchanger for the purpose of cooling it to a temperature below about 50° C. Subsequently, the cooled gas proceeds into the absorber column, while the pump facilitates the circulation of the solvent to the spray system within the column. The solvent is then sprayed inside the absorber column, effectively reacting with the exhaust gas to capture carbon dioxide ($CO_2$). FIG. 4 shows the complete system during the experiments.

In certain embodiments, the spray design of the solvent in the $CO_2$ capture system may be modified to various exemplary alternatives:

Exemplary Alternative 1

The spray arrangement may be equipped with six nozzles to maximize the coverage area through a full cone spray pattern. This pattern ensures that the spray is distributed uniformly, covering an equivalent area in all directions. The six nozzles work in tandem to ensure that the spray is evenly distributed, thereby allowing complete coverage of the surface being targeted. This spray system is particularly suited for use in situations that require quick and efficient coverage of large surface areas. The six nozzles work in conjunction to produce a high-pressure spray that can travel over long distances, guaranteeing complete coverage of the surface being targeted.

Exemplary Alternative 2

The spray arrangement comprises a circular-shape with nine nozzles that enable the distribution of liquid or mist substances onto the surrounding walls. The nozzles are arranged evenly around the circular shape and are positioned specifically to ensure a uniform spray pattern. The central cavity of the nozzle facilitates the even distribution of the solvent in all directions, covering all surfaces, including hard-to-reach areas. The design of this spray system is highly efficient and effective, with the nine nozzles increasing the coverage area of the spray. In summary, the circular-shaped spray with nine nozzles and a central cavity represents an optimal solution for the even distribution of substances onto surrounding walls.

Exemplary Alternative 3

A spray system with a single nozzle is a highly specialized and efficient device commonly utilized to disperse solvents uniformly over a targeted surface. The design of the nozzle is of utmost importance, as it must be engineered to generate a finely dispersed mist or spray that can uniformly cover a large surface area. This may involve manipulation of the nozzle's flow rate, angle, and shape to achieve the desired spray pattern. The resulting finely dispersed mist created by the nozzle ensures that the solvent is distributed evenly, reducing the risk of over- or under-application. Additionally, the single-nozzle design of the spray system makes it easy to operate and maintain, resulting in lower operating costs and greater ease of use. Overall, a spray system with one nozzle is an efficient and cost-effective tool that contributes to greater environmental sustainability.

EXAMPLES

Initially, interconnections among all subsystems of the portable $CO_2$ capture system have been established, and rigorous testing has been conducted to ensure the integrity of the connections, mitigating the possibility of any potential leaks. The operational procedure of the product commences by closing the exhaust outlet valve of the engine, allowing the exhaust gas to enter the heat exchanger for the purpose of cooling it to a temperature below 50° C. Subsequently, the cooled gas proceeds into the absorber column, while the pump facilitates the circulation of the solvent to the spray system within the column. The solvent is then sprayed inside the absorber column, effectively reacting with the exhaust gas to capture carbon dioxide ($CO_2$). Then, the used solvent is collected in a storage tank for the regeneration process later on.

Experimental Results

Figure 7:
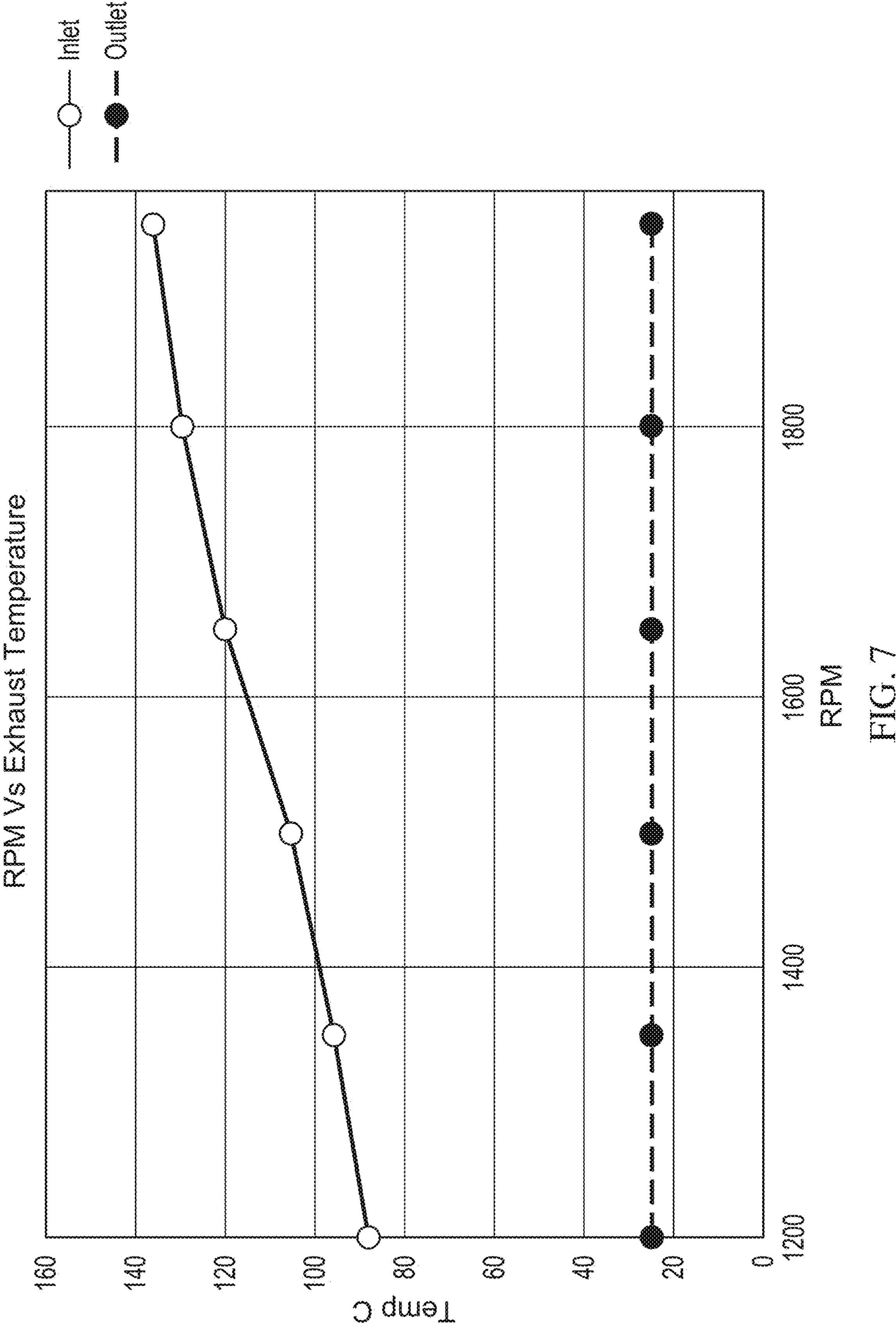
FIG. 7 illustrates exhaust gas temperatures at an inlet and outlet of a heat exchanger.

Results from experimental testing for the heat exchanger revealed valuable insights into its performance characteristics. Two experiments were conducted to assess its efficiency under different conditions. In the first test, the load was set to a constant value, while the RPM of the diesel engine was gradually increased from 1200 RPM to 1950 RPM. The graph plotting RPM versus temperature indicated that at the inlet of the heat exchanger, the temperature increased with the rise in RPM, reaching a maximum inlet temperature of 135.8° C. at 1950 RPM, while the outlet temperature of the heat exchanger was 26° C., as shown in FIG. 7. In the second experiment, not shown here, the engine speed was kept constant and the load was increased from 0-4 N.m. Similar results were obtained. These results demonstrate the effectiveness of the heat exchanger in cooling the exhaust gas, as it successfully maintained low outlet temperatures despite the increasing heat load.

Emission Results

As previously indicated, a comprehensive analysis of the engine emissions under three distinct scenarios was conducted. Firstly, the emissions from the engine without the use of the developed $CO_2$ capture system of certain embodiments was evaluated. Second, the emissions while the engine was equipped with the system were measured, and lastly, the emissions were measured with the system after including a mesh component inside the absorber to enhance the capturing efficiency. To measure the emissions accurately, a gas analyzer capable of quantifying the levels of carbon monoxide (CO), carbon dioxide ($CO_2$), and hydrocarbons (HC) was utilized.

Figure 8:
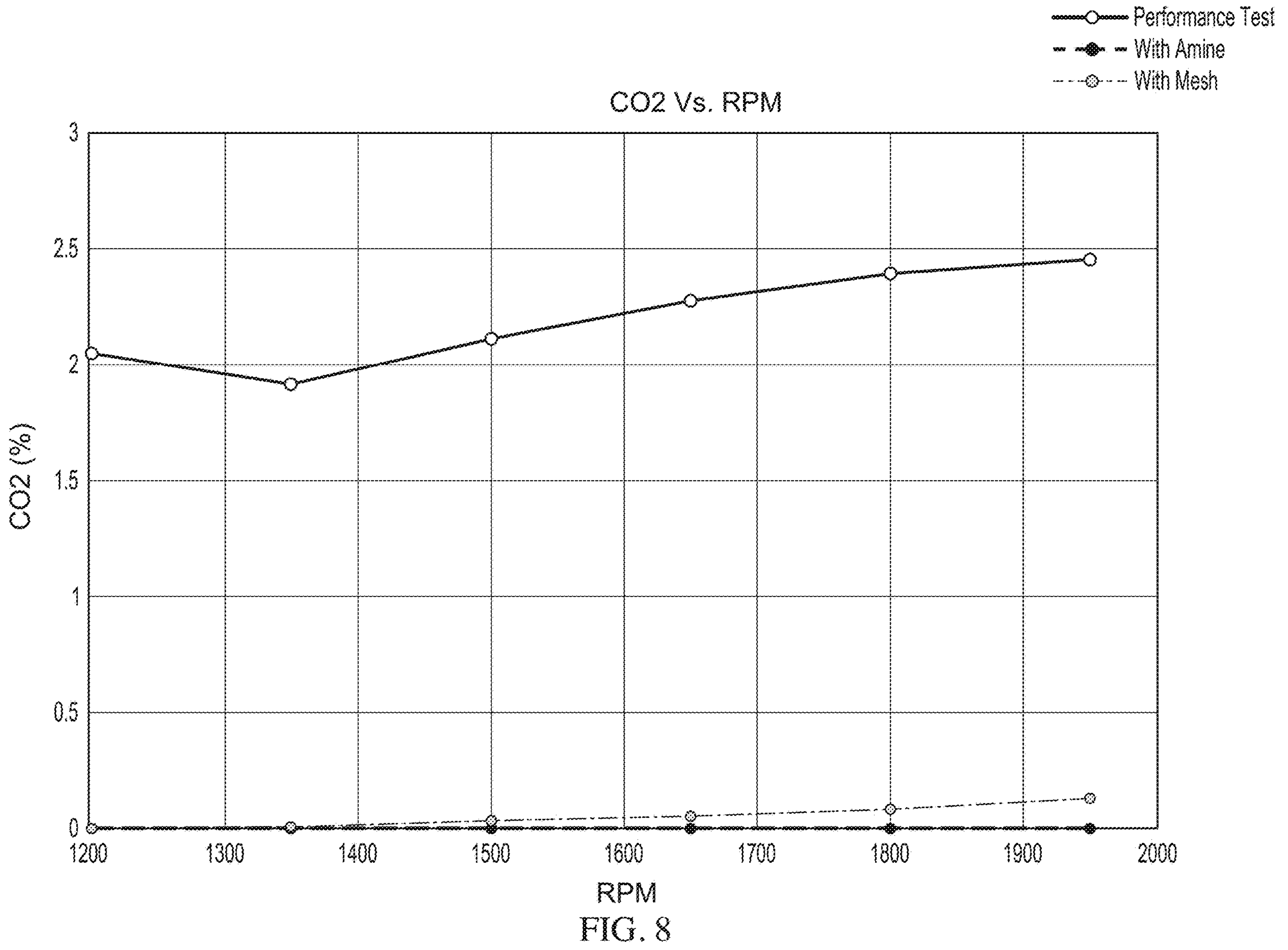
FIG. 8 illustrates $CO_2$ emission measurements without connecting the system (performance test), and after connecting the system with and without a mesh inside an absorber as a function of engine speed.
Figure 9:
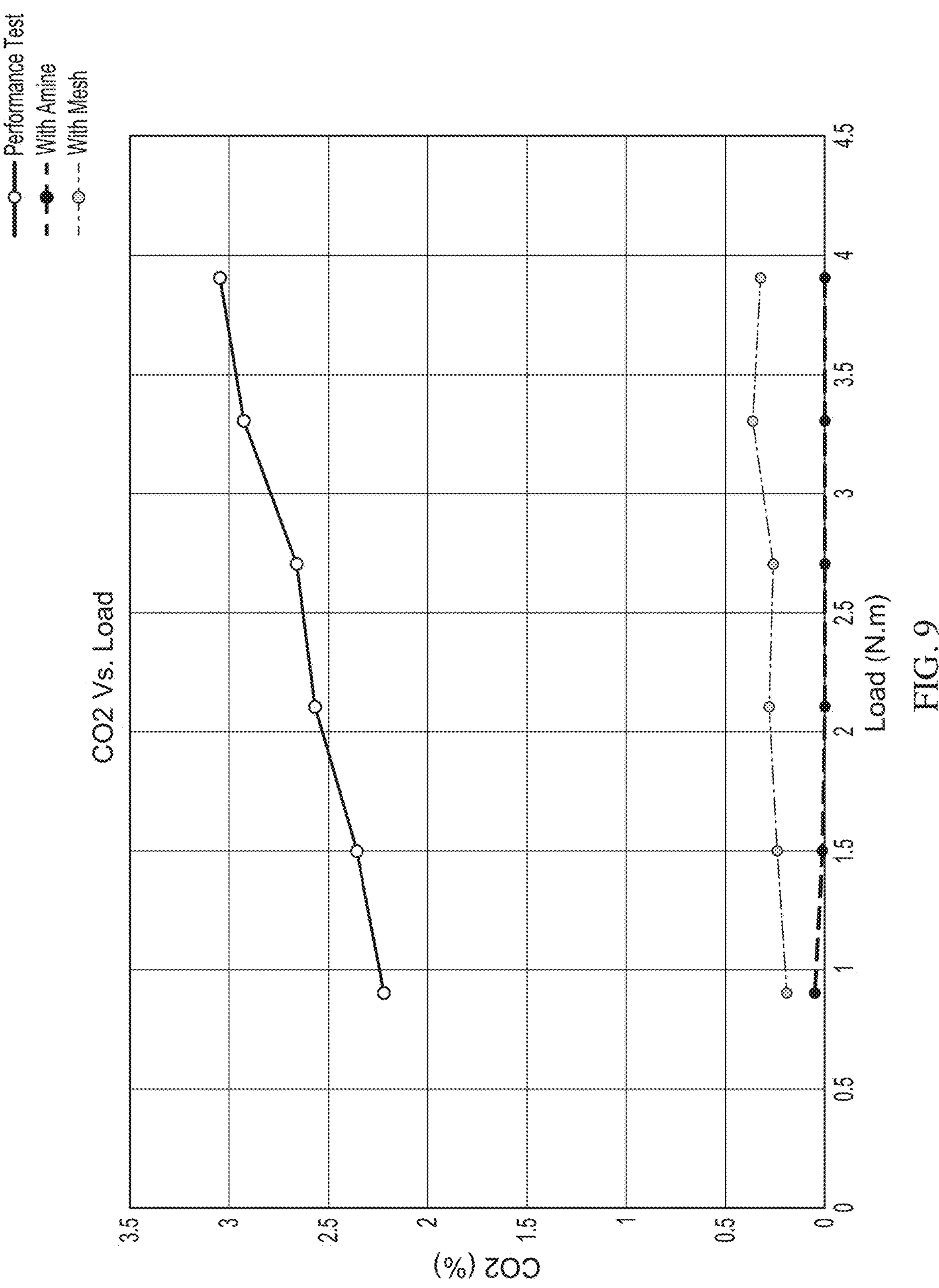
FIG. 9 illustrates $CO_2$ emission measurements without connecting the system (performance test), and after connecting the system with and without the mesh inside the absorber as a function of engine load.

As illustrated in FIGS. 8 and 9, the maximum-recorded $CO_2$ concentration reached 3.05% when the novel $CO_2$ capture system was not applied. However, upon integrating the system with the exhaust tube of the engine, the $CO_2$ level notably decreased to 0% in both tests. Furthermore, when the mesh component was included within the system, the experiment demonstrated a substantial reduction in $CO_2$ concentration, measuring less than 0.5%. Therefore, it is clear that the performance of the capturing system is better without introducing the mesh than with it.

Figure 10:
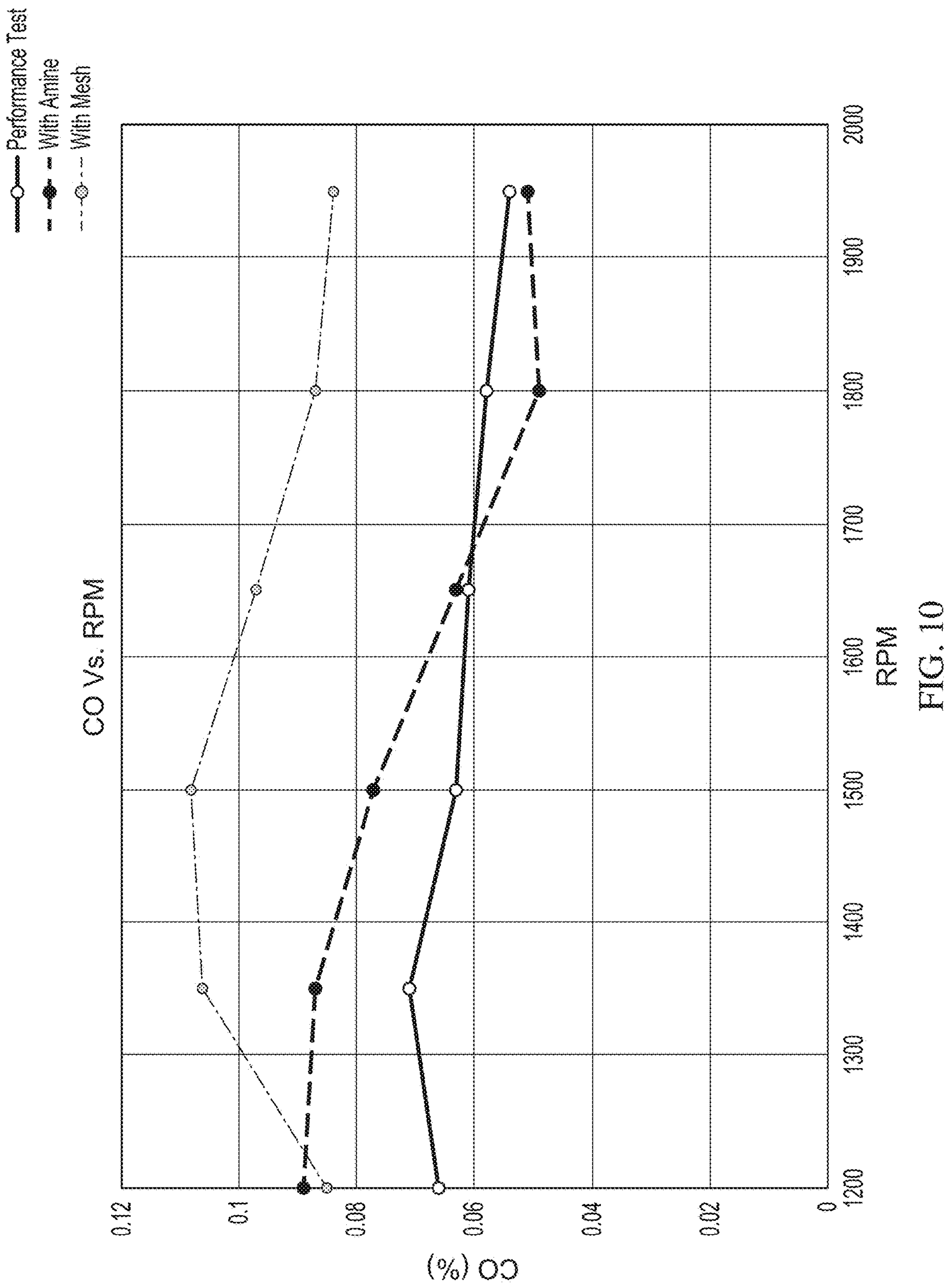
FIG. 10 illustrates CO emission measurements without connecting the system (performance test), and after connecting the system with and without the mesh inside the absorber as a function of engine speed.
Figure 11:
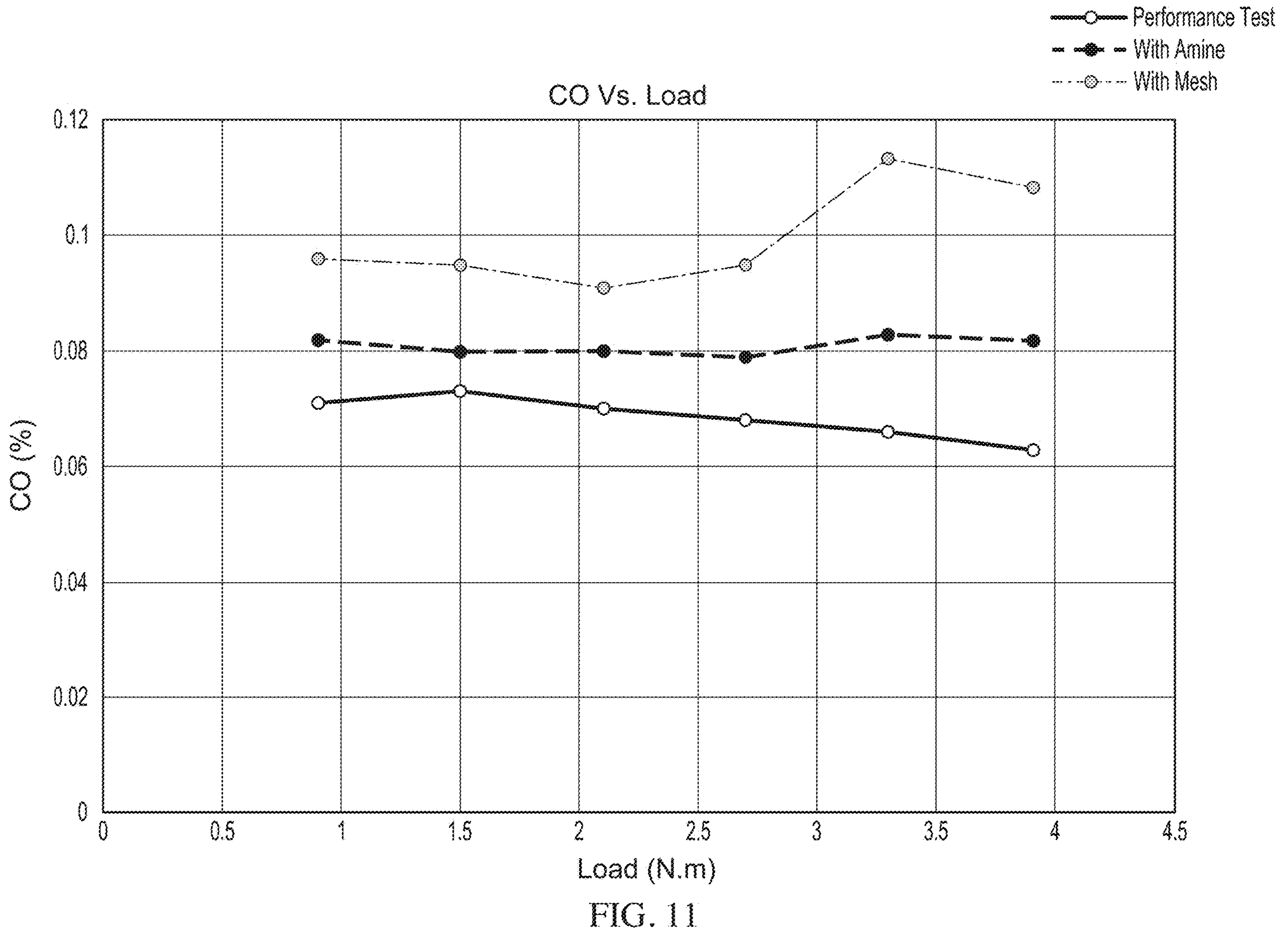
FIG. 11 illustrates CO emission measurements without connecting the system (performance test), and after connecting the system with and without the mesh inside the absorber as a function of engine load.

As illustrated in FIGS. 10 and 11, the maximum recorded CO concentration reached 0.073% without connecting the $CO_2$ capture system. However, upon integrating the system, there was a slight increase in CO levels, reaching approximately 0.08% during the variable load test. However, in the variable speed test, the CO concentration was found to be slightly lower than that of the performance test, by a negligible margin. In the experiment involving the mesh component integrated within the system, there was an observable increase in the CO percentage, reaching 0.113%. In both tests, the CO concentration hovered around 0.1%.

Figure 12:
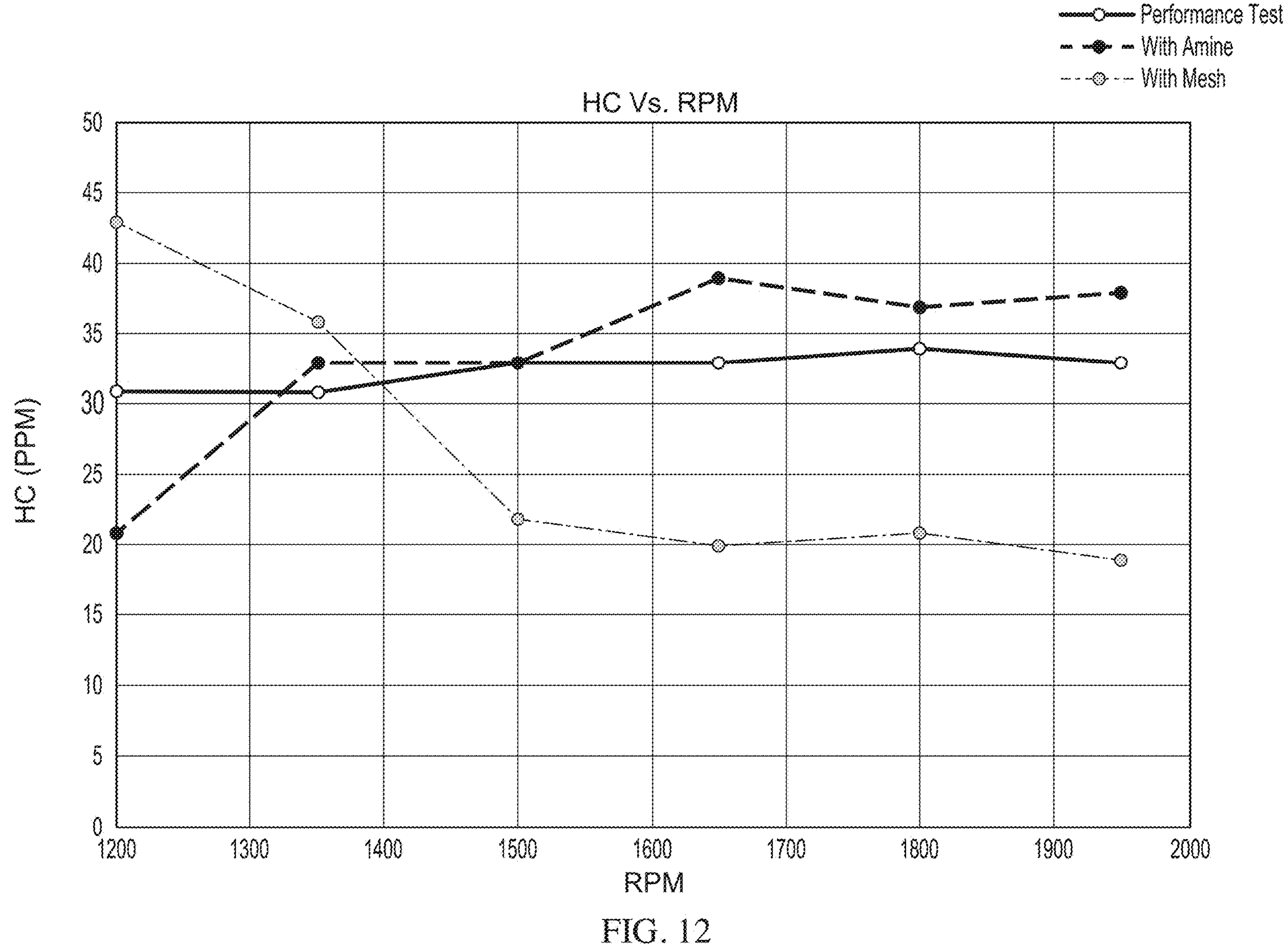
FIG. 12 illustrates example HC emission measurements without connecting the system (performance test), and after connecting the system with and without mesh inside the absorber as a function of engine speed.
Figure 13:
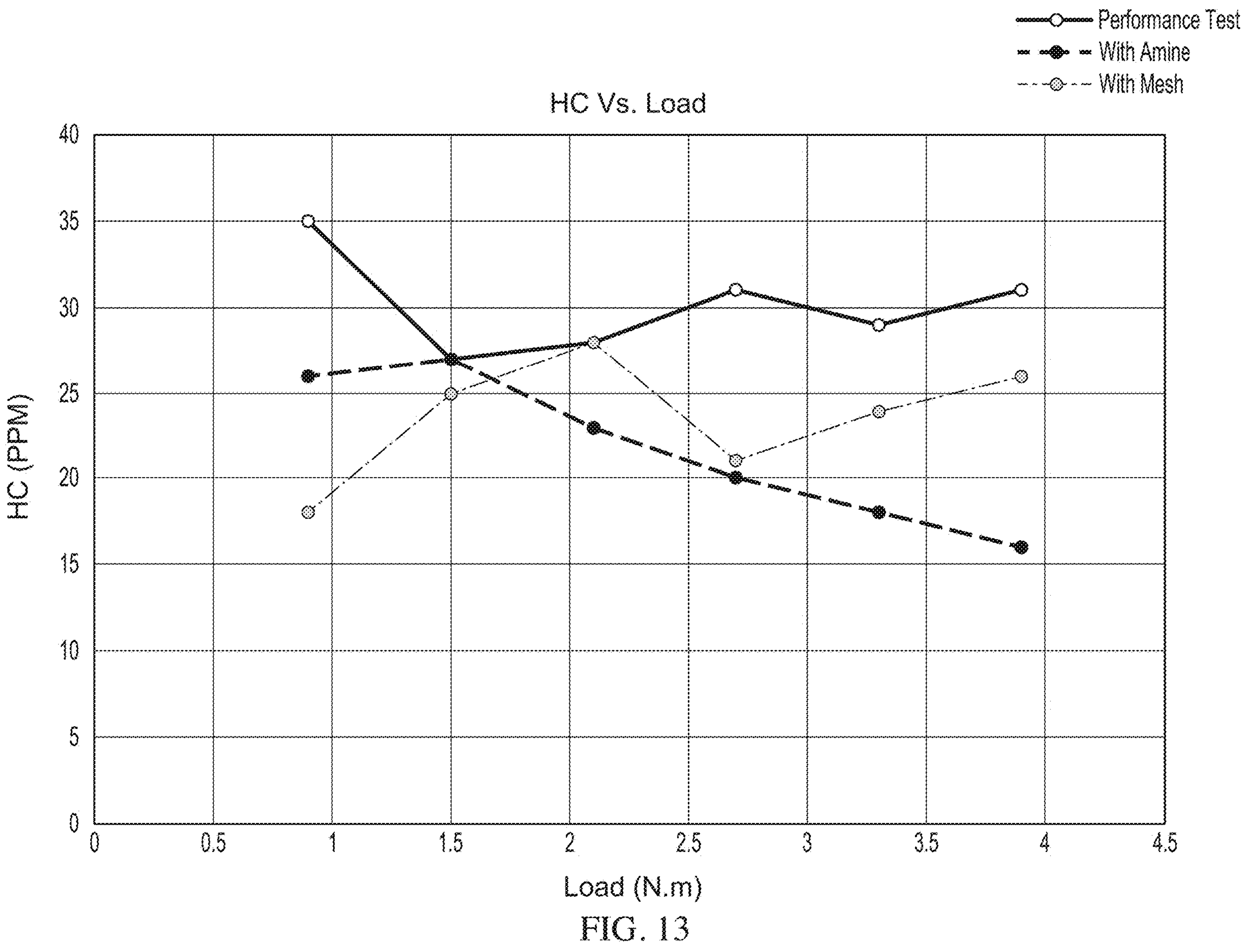
FIG. 13 illustrates example HC emission measurements without connecting the system (performance test), and after connecting the system with and without mesh inside the absorber as a function of engine load.

According to the findings presented in FIGS. 12 and 13, the highest concentration of hydrocarbons (HC) recorded was 35 parts per million (PPM) when the $CO_2$ capture system was not applied. However, upon integrating the system, the HC levels notably decreased to 16 PPM during the variable load test. However, in the variable speed test, the HC concentration was slightly higher than that of the performance test, albeit by a negligible amount. In the experiment involving the integration of the mesh component within the absorber column, there was a discernible decrease in the HC concentration, ranging from approximately 20 to 25 PPM in both experiments.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

The invention claimed is:

1. A portable carbon capture and emission reduction system to reduce $CO_2$ emissions as well as CO and HC emissions from diesel engines comprising:

(a) A fin and tube heat exchanger configured to cool exhaust gas from the diesel engine to a temperature lower than 50° C.;

(b) A packed absorber column comprising plates, wherein cooled exhaust gas is introduced at a lower section of the absorber column and absorbing solvent is introduced at a top section of the absorber column via a single nozzle, six nozzles, or nine nozzles, and the absorbing solvent is configured to absorb $CO_2$ and reduce CO and HC emissions from the cooled exhaust gas flowing from the lower section to the top section; and (c) A tank configured to store used absorbing solvent collected from the absorber column, wherein the used absorbing solvent is removable from the tank to be taken to a separate regeneration process at a separate location.

2. The portable carbon capture and emission reduction system of claim 1, wherein the absorber column has a height of 80 cm and a diameter of 20 cm.

3. The portable carbon capture and emission reduction system of claim 1, comprising a single nozzle capable of emitting the solvent in a cone-shaped fog pattern.

4. The portable carbon capture and emission reduction system of claim 1, comprising six nozzles capable of emitting the solvent in a full cone spray pattern.

5. The portable carbon capture and emission reduction system of claim 1, comprising nine nozzles.

6. The portable carbon capture and emission reduction system of claim 1, comprising a single nozzle, six nozzles, or nine nozzles capable of breaking the solvent down into a droplet that is 0.3 mm in diameter.

7. The portable carbon capture and emission reduction system of claim 1, wherein the heat exchanger is 54 cm in length, 50 cm in height, and feature a configuration of 12 fins per inch.

8. The portable carbon capture and emission reduction system of claim 1, wherein the absorbing solvent is monoethanolamine.

9. The portable carbon capture and emission reduction system of claim 1, further comprising a mesh component inside the absorber column.

10. The portable carbon capture and emission reduction system of claim 1, further comprising a positive displacement pump configured to circulate the absorbing solvent to the nozzle or nozzles within the absorber column.

11. A method of capturing $CO_2$ emissions and reducing CO and HC emissions from diesel engines comprising:

(a) Cooling exhaust gas from the diesel engine to a temperature lower than 50° C. with a fin and tube heat exchanger;

(b) Absorbing $CO_2$ from the cooled exhaust gas flowing through a packed absorber column comprising plates, wherein the cooled exhaust gas is introduced at a lower section of the absorber column and absorbing solvent is introduced at a top section of the absorber column via a single nozzle, six nozzles, or nine nozzles, and the absorbing solvent is configured to absorb $CO_2$ and reduce CO and HC emissions from the cooled exhaust gas flowing from the lower section to the top section; and (c) Storing the used absorbing solvent in a tank, wherein the used absorbing solvent is removable from the tank to be taken to a separate regeneration process at a separate location.

12. The method of claim 11, wherein the absorber column has a height of 80 cm and a diameter of 20 cm.

13. The method of claim 11, comprising a single nozzle capable of emitting the solvent in a cone-shaped fog pattern.

14. The method of claim 11, comprising six nozzles capable of emitting the solvent in a full cone spray pattern.

15. The method of claim 11, comprising nine nozzles.

16. The method of claim 11, comprising a single nozzle, six nozzles, or nine nozzles capable of breaking the solvent down into a droplet that is 0.3 mm in diameter.

17. The method of claim 11, wherein the heat exchanger is 54 cm in length, 50 cm in height, and feature a configuration of 12 fins per inch.

18. The method of claim 11, wherein the absorbing solvent is monoethanolamine.

19. The method of claim 11, further comprising circulating the absorbing solvent to the nozzle or nozzles with a positive displacement pump.

* * * * *